United States Patent
Hara (10) Patent No.: US 9,873,456 B2
(45) Date of Patent: Jan. 23, 2018

(54) ONBOARD BATTERY FOR VEHICLE

(71) Applicant: FUJI JUKOGYO KABUSHIKI KAISHA, Tokyo (JP)

(72) Inventor: Toshiyuki Hara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/280,570

(22) Filed: Sep. 29, 2016

(65) Prior Publication Data

US 2017/0088182 A1 Mar. 30, 2017

(30) Foreign Application Priority Data

Sep. 30, 2015 (JP) .................................. 2015-193222

(51) Int. Cl.
- B60R 16/04 (2006.01)
- B62D 21/15 (2006.01)
- B60K 1/04 (2006.01)
- B62D 25/20 (2006.01)

(52) U.S. Cl.
CPC .............. *B62D 21/155* (2013.01); *B60K 1/04* (2013.01); *B62D 25/2072* (2013.01); *B60K 2001/0438* (2013.01); *B60Y 2306/01* (2013.01)

(58) Field of Classification Search
CPC .................. B62D 21/15; B62D 21/152; B60K 2015/0675; B60K 2001/0416
USPC ................................................ 180/232, 68.5
See application file for complete search history.

(56) References Cited

U.S. PATENT DOCUMENTS

| | | | | |
|---|---|---|---|---|
| 4,621,822 A * | 11/1986 | Knochelmann | ...... | B60K 15/063 280/834 |
| 5,476,151 A * | 12/1995 | Tsuchida | .................. | B60K 1/00 180/274 |
| 5,947,223 A * | 9/1999 | Rebmann | ................ | B60R 21/00 180/232 |
| 6,386,611 B1 * | 5/2002 | Buchfink | ................ | B60R 11/02 296/187.08 |
| 6,431,300 B1 * | 8/2002 | Iwase | ...................... | B60K 1/04 180/68.5 |

(Continued)

FOREIGN PATENT DOCUMENTS

| | | |
|---|---|---|
| JP | 2006-335243 A | 12/2006 |
| JP | 2010-089567 A | 4/2010 |

(Continued)

OTHER PUBLICATIONS

Office Action received for Japanese Patent application No. 2015-193222, dated Dec. 20, 2016, 7 pages of office action including 4 pages of English translation.

*Primary Examiner* — Jeffrey J Restifo

(74) *Attorney, Agent, or Firm* — Chip Law Group (57) ABSTRACT

An onboard battery for a vehicle, the vehicle having a crushable area in which a functional component with a predetermined function is disposed, the crushable area being formed between a pair of rear side frames located apart from each other in a transversal direction, includes a housing case disposed in front of the crushable area, a holding frame that is fixed to a vehicle body and includes a frame-shaped part including a pair of first portions apart from each other in a longitudinal direction and a pair of second portions apart from each other in the transversal direction, and a battery module including a battery cell.

20 Claims, 8 Drawing Sheets

(56) References Cited

U.S. PATENT DOCUMENTS

| | | | | |
|---|---|---|---|---|
| 6,808,229 B2* | 10/2004 | Yamaguchi | B62D 21/152 | |
| | | | 296/203.02 | |
| 7,066,515 B2* | 6/2006 | Pierce | B60R 19/00 | |
| | | | 180/68.5 | |
| 7,070,015 B2* | 7/2006 | Mathews | B60K 1/04 | |
| | | | 180/274 | |
| 7,717,207 B2* | 5/2010 | Watanabe | B60K 1/04 | |
| | | | 180/274 | |
| 7,836,999 B2* | 11/2010 | Kato | B62D 21/11 | |
| | | | 180/312 | |
| 8,037,960 B2* | 10/2011 | Kiya | B60K 1/04 | |
| | | | 180/68.5 | |
| 8,051,934 B2* | 11/2011 | Kiya | B60K 1/04 | |
| | | | 180/274 | |
| 8,708,402 B2* | 4/2014 | Saeki | B60K 1/04 | |
| | | | 180/68.5 | |
| 8,839,895 B2* | 9/2014 | Kato | B60K 1/04 | |
| | | | 180/68.5 | |
| 8,863,878 B2* | 10/2014 | Shirooka | B60K 1/04 | |
| | | | 180/68.5 | |
| 9,022,457 B2* | 5/2015 | Hirano | B60K 1/00 | |
| | | | 180/68.5 | |
| 9,120,508 B2* | 9/2015 | Pohl | B62D 25/2027 | |
| 9,205,872 B2* | 12/2015 | Okada | B62D 25/20 | |
| 9,517,686 B1* | 12/2016 | Paramasivam | B60K 1/04 | |
| 2004/0090085 A1* | 5/2004 | Kawasaki | B60K 1/04 | |
| | | | 296/187.09 | |
| 2004/0226765 A1* | 11/2004 | Mathews | B60K 1/04 | |
| | | | 180/68.5 | |
| 2007/0215399 A1* | 9/2007 | Watanabe | B60K 1/04 | |
| | | | 180/68.5 | |
| 2009/0026802 A1* | 1/2009 | Imada | B62D 21/152 | |
| | | | 296/187.11 | |
| 2009/0226806 A1* | 9/2009 | Kiya | B60K 1/04 | |
| | | | 429/186 | |
| 2009/0242298 A1* | 10/2009 | Guss | B60K 1/04 | |
| | | | 180/68.5 | |
| 2010/0101885 A1* | 4/2010 | Nozaki | B60K 1/00 | |
| | | | 180/232 | |
| 2015/0166109 A1* | 6/2015 | Eberle | B60K 1/04 | |
| | | | 180/232 | |
| 2015/0197144 A1* | 7/2015 | Jarocki | B60K 1/04 | |
| | | | 180/232 | |
| 2015/0249240 A1* | 9/2015 | Hihara | B60K 1/04 | |
| | | | 180/68.5 | |
| 2015/0251560 A1* | 9/2015 | Ishikawa | B62D 21/15 | |
| | | | 180/232 | |
| 2016/0137046 A1* | 5/2016 | Song | B60K 1/04 | |
| | | | 180/68.5 | |
| 2017/0087972 A1* | 3/2017 | Hara | B62D 25/2027 | |
| 2017/0096067 A1* | 4/2017 | Murata | B60K 1/04 | |

FOREIGN PATENT DOCUMENTS

| | | |
|---|---|---|
| JP | 5206110 B | 6/2013 |
| JP | 2014-222641 A | 11/2014 |
| JP | 2014221625 A | 11/2014 |
| JP | 2014222640 A | 11/2014 |
| JP | 2015117021 A | 6/2015 |

\* cited by examiner

ONBOARD BATTERY FOR VEHICLE

CROSS-REFERENCE TO RELATED APPLICATIONS

The present application claims priority from Japanese Patent Application No. 2015-193222 filed on Sep. 30, 2015, the entire contents of which are hereby incorporated by reference.

BACKGROUND

1. Technical Field

The present invention relates to the technical field of onboard batteries that are installed in vehicles in which a functional component with a predetermined function is disposed in a crushable area.

2. Related Art

Onboard batteries are installed in various vehicles, such as automobiles, in order to supply electric power to motors and other various electrical components.

In recent years, in particular, vehicles such as electric vehicles (EV), hybrid electric vehicles (HEV), and plug-in hybrid electric vehicles (PHEV) have gained widespread use. In these electricity-driven vehicles, onboard batteries having a high electricity-storage function are installed.

An onboard battery includes a housing case and a battery module housed in the housing case. The battery module is configured by, for example, arranging a plurality of battery cells (secondary batteries), such as nickel hydrogen batteries or lithium ion batteries. In some onboard batteries to be installed in an electric vehicle or the like, in order to retain a high electricity-storage function, a plurality of battery modules are disposed in the housing case and battery cells in each of the battery modules are coupled in series or in parallel.

An example of such an onboard battery is disposed in a trunk formed in a rear part of a vehicle (see Japanese Patent No. 5206110).

The onboard battery described in Japanese Patent No. 5206110 is partly inserted into a disposition depression having an upward opening in a floor panel, and is located between rear side frames of a vehicle body, which are provided apart from each other in the transversal direction.

In a vehicle equipped with the onboard battery described in Japanese Patent No. 5206110, the onboard battery is disposed in the front side of the trunk, and a space behind the housing case in the trunk is formed as a crushable area. Accordingly, when a load is applied from behind by collision from behind the vehicle, the pair of rear side frames is crushed to absorb a shock, so that the onboard battery is protected.

On the other hand, in the vehicle equipped with the onboard battery described in Japanese Patent No. 5206110, if collision from behind the vehicle is severe, there is a possibility that the rear side frames are crushed and also a large load is applied from behind to the onboard battery. When a load is applied to the onboard battery, an inclined part of the housing case is guided to a front surface part forming the disposition depression, and the entire onboard battery is moved diagonally up-forward so as to avoid a cross-member located in front of the disposition depression. Accordingly, the onboard battery does not collide with the cross-member, which suppresses an excessive load to a battery module housed inside the housing case.

In a vehicle in which an onboard battery is disposed in a trunk as described above, a functional component with a predetermined function is disposed in a crushable area in some cases. Examples of the functional component include a fan motor that performs intake and exhaust for cooling each component disposed inside a housing case, a blowout repair kit for repairing a tire blowout, and a jack etc. for lifting a vehicle. These components such as the fan motor have high rigidity.

If a vehicle in which such a functional component is disposed in a crushable area is involved in a severe collision, the functional component disposed in the crushable area is moved forward by the collision; thus, the functional component may break the housing case to damage or break each component disposed inside the housing case.

As an example other than a collision from behind the vehicle, if a rear part of the vehicle equipped with the onboard battery collides with a telegraph pole etc. due to spin or the like (i.e., if so-called pole collision occurs), a portion between a pair of rear side frames in the vehicle body collides with the telegraph pole etc. in some cases. Also in this case, the functional component disposed in the crushable area is moved forward by the collision; thus, the functional component may damage or break each component disposed inside the housing case.

SUMMARY OF THE INVENTION

It is desirable to prevent each component disposed inside a housing case from being damaged or broken in collision.

Firstly, an aspect of the present invention provides an onboard battery for a vehicle, the vehicle having a crushable area in which a functional component with a predetermined function is disposed, the crushable area being formed between a pair of rear side frames located apart from each other in a transversal direction, the onboard battery including: a housing case disposed in front of the crushable area; a holding frame that is fixed to a vehicle body and includes a frame-shaped part including a pair of first portions apart from each other in a longitudinal direction and a pair of second portions apart from each other in the transversal direction; and a battery module including a battery cell. The housing case is held by the holding frame, being inserted into the frame-shaped part, the battery module is housed inside the housing case, the functional component is located below the frame-shaped part between the pair of second portions, and a rear end portion of the inside of the housing case is provided with a housing part capable of housing the functional component when the functional component is moved forward by a collision.

Secondly, the battery module may be located at or below a height of upper surfaces of the rear side frames between the pair of rear side frames.

Thirdly, the battery module may be located beside the functional component in the transversal direction.

Fourthly, a battery control unit and a junction box may be disposed inside the housing case, and the battery control unit and the junction box may be located at or below a height of upper surfaces of the rear side frames between the pair of rear side frames.

Fifthly, a shock-absorbing member that absorbs a shock in a collision from behind may be mounted on the housing case.

Sixthly, the shock-absorbing member may be mounted on a bottom surface part of the housing case, and the battery module may be disposed on the shock-absorbing member.

Seventhly, the shock-absorbing member may be provided with base parts located above the bottom surface part, the base parts being located apart from each other in the transversal direction, and the battery module may be disposed to extend over the adjacent base parts.

BRIEF DESCRIPTION OF THE DRAWINGS

FIG. 3 is an exploded perspective view of a housing case and the like;

DETAILED DESCRIPTION

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

An implementation of an onboard battery of the present invention will be described below with reference to the appended drawings.

Figure 1:
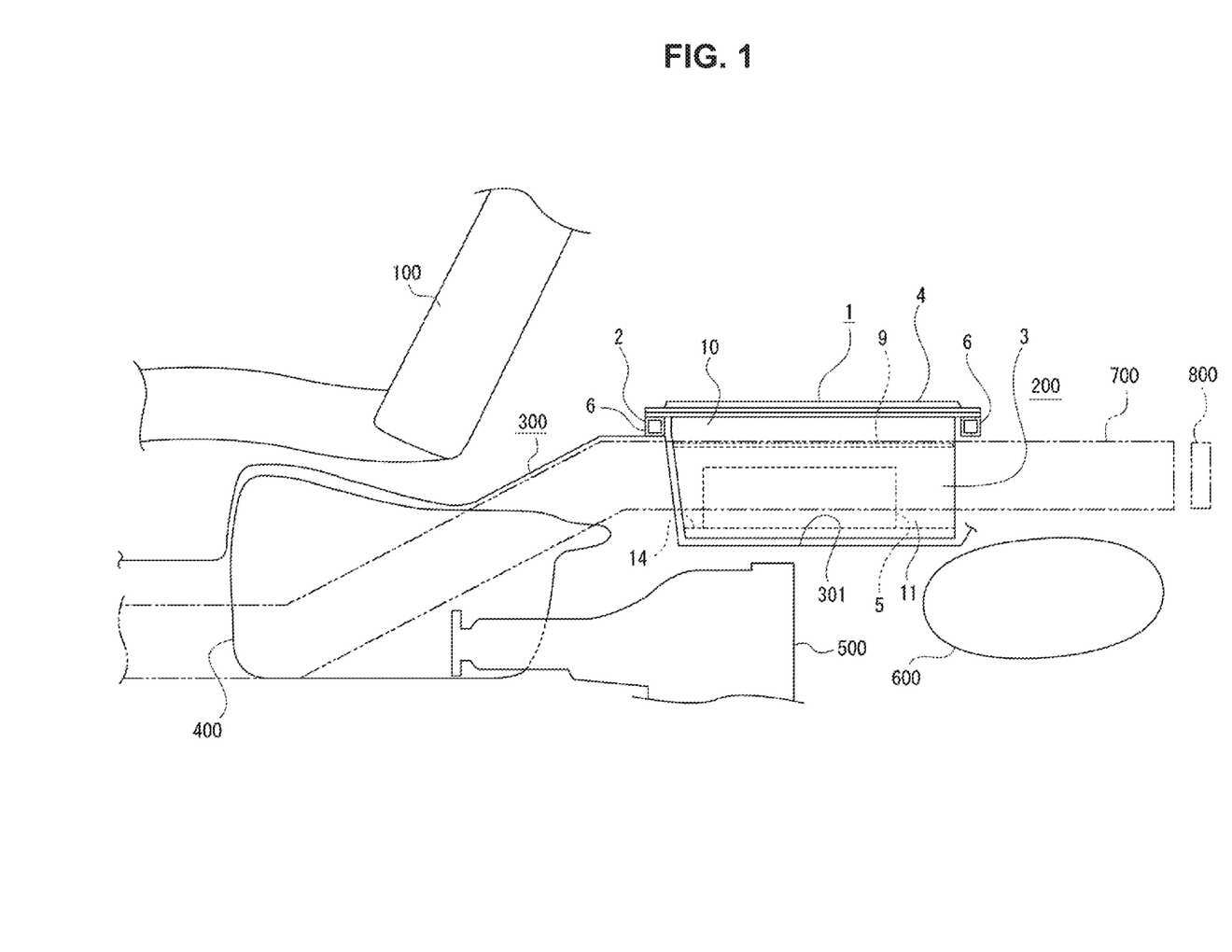
FIG. 1 illustrates an implementation of an onboard battery according to the present invention together with FIGS. 2 to 8, and is a schematic side view illustrating a state or the like of installation of the onboard battery.
Figure 2:
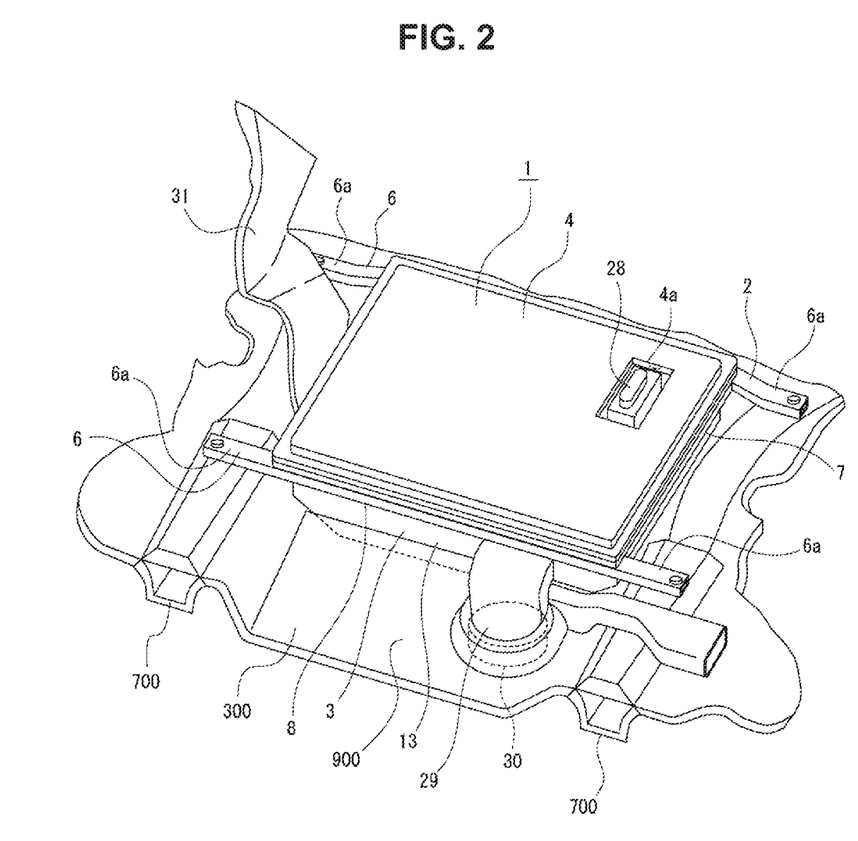
FIG. 2 is a perspective view illustrating a state or the like of installation of the onboard battery.
Figure 3:
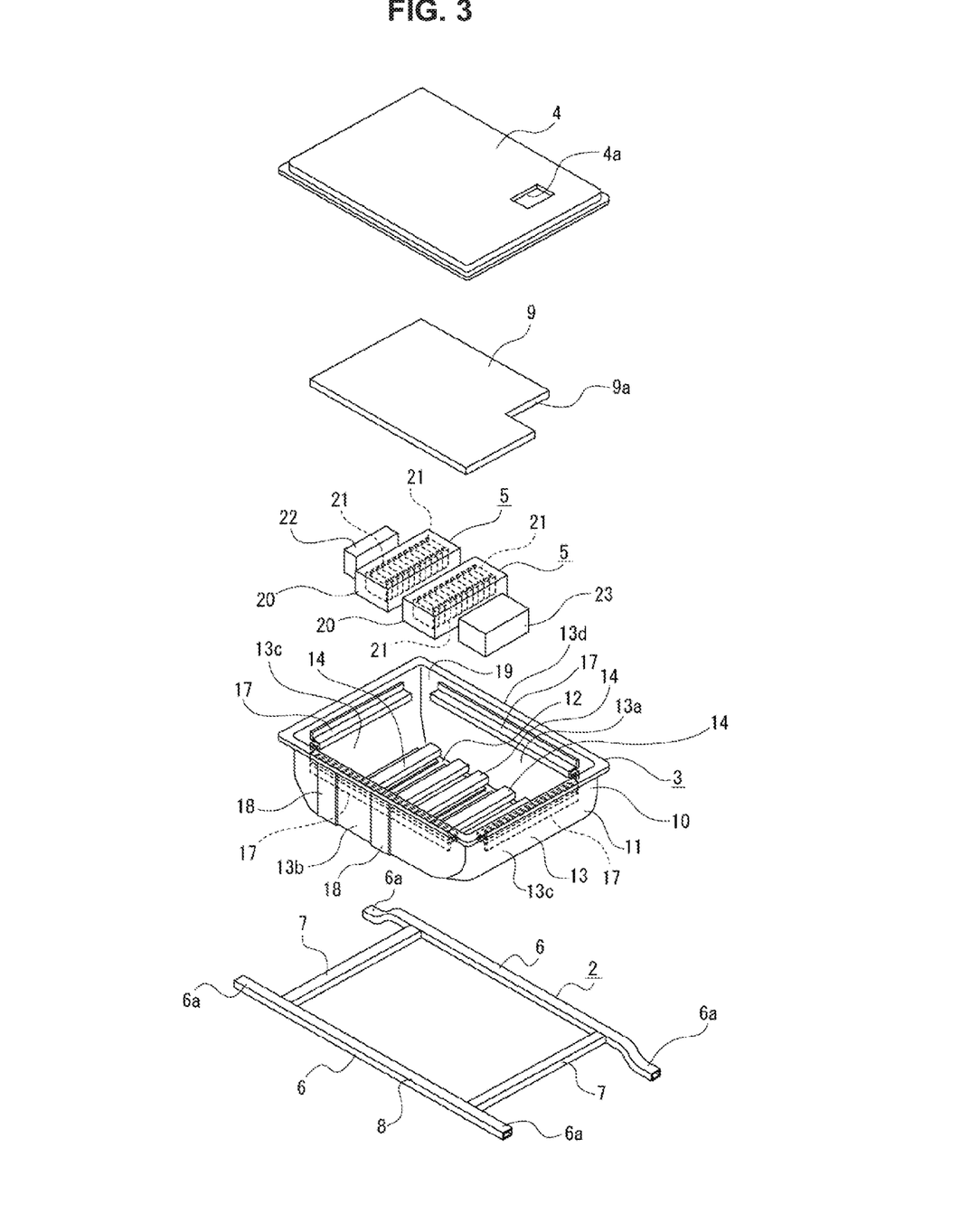

An onboard battery 1 includes a holding frame 2, a housing case 3, a cover body 4, and two battery modules 5 (see FIGS. 1 to 3).

The onboard battery 1 is at least partly disposed on a floor panel 300 in a trunk 200 located behind rear seats 100 (see FIG. 1). The floor panel 300 is provided with a disposition depression 301 having an upward opening in the trunk 200. Below the floor panel 300 are located a fuel tank 400, two rear suspensions 500, and a muffler 600. The fuel tank 400 is located below the rear seats 100.

The holding frame 2 includes two first portions 6 that extend in the transversal direction and are located apart from each other in the longitudinal direction and two second portions 7 that extend in the longitudinal direction and are located apart from each other in the transversal direction, which are coupled into the shape of parallel crosses (see FIGS. 2 and 3). Left and right both end portions 6a of the two first portions 6 project sideward (outward) from the two second portions 7. A portion of the holding frame 2 excluding the left and right both end portions 6a of the two first portions 6 is provided as a rectangular frame-shaped part 8.

Inside the housing case 3 is disposed a partition plate 9 with a flat plate shape. One side portion of a front end portion of the partition plate 9 is provided with a notch 9a. In the housing case 3, a portion above the partition plate 9 is provided as an upper housing part 10, and a portion below the partition plate 9 is provided as a lower housing part 11. Accordingly, the partition plate 9 partitions the inside of the housing case 3 into an upper stage and a lower stage, and in the lower stage, for example, the two battery modules 5 are housed apart from each other in the transversal direction.

The housing case 3 includes a bottom surface part 12 facing the vertical direction and a peripheral surface part 13 whose lower edge is continuous with an outer peripheral edge of the bottom surface part 12. The peripheral surface part 13 includes a front wall part 13a, a rear wall part 13b, two side wall parts 13c, and a mounted part 13d. The mounted part 13d is formed in the shape of a flange protruding outward from upper edges of the front wall part 13a, the rear wall part 13b, and the two side wall parts 13c.

The housing case 3 is inserted into the frame-shaped part 8 of the holding frame 2 from above, so that a lower surface of the mounted part 13d is in contact with an upper surface of the frame-shaped part 8, and the mounted part 13d is fastened to the frame-shaped part 8 with a bolt or the like to be fixed to the holding frame 2 (see FIG. 2).

One side portion of a front end portion of the cover body 4 is provided with a communicating hole 4a.

The onboard battery 1 is disposed in the trunk 200 in a state where a lower stage including the lower housing part 11 is inserted into the disposition depression 301 of the floor panel 300 (see FIGS. 1 and 2). Accordingly, an upper stage including the upper housing part 10 is located above an upper surface of the floor panel 300.

The both end portions 6a of the two first portions 6 of the holding frame 2 of the onboard battery 1 are fixed to the floor panel 300 with a bolt or the like.

Right beside the lower stage of the housing case 3 are located two rear side frames 700 extending in the longitudinal direction, which are skeletal frames of the vehicle body, and rear ends of the two rear side frames 700 are located behind the onboard battery 1. Behind the two rear side frames 700 is disposed a bumper beam 800 extending in the transversal direction.

A space behind the housing case 3 in the trunk 200 is formed as a crushable area 900.

Figure 4:
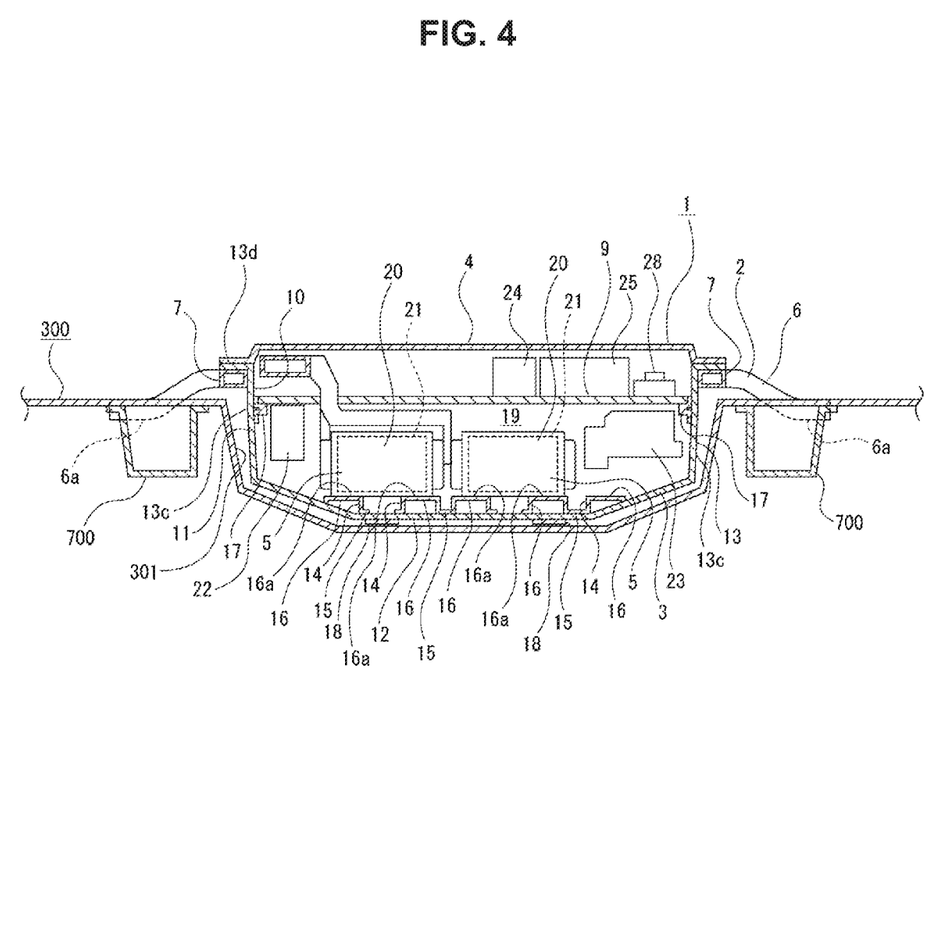
FIG. 4 is a cross-sectional view illustrating a state or the like of disposition of each component in a housing case.

As described above, the lower housing part 11 of the housing case 3 is disposed in the disposition depression 301 by the holding frame 2 being fixed to the floor panel 300, and the lower housing part 11 is located between the two rear side frames 700 located apart from each other in the transversal direction (see FIG. 4).

On an upper surface of the bottom surface part 12 of the housing case 3, three shock-absorbing members 14 are mounted apart from each other in the transversal direction (see FIG. 3). Each shock-absorbing member 14 includes a disposition surface part 15 with a flat plate shape facing the vertical direction and a projecting part 16 projecting upward from the disposition surface part 15 and having a U-shaped cross-section with a downward opening, which are integrally formed. One projecting part 16 is provided or two projecting parts 16 are provided apart from each other in the transversal direction, and an upper surface part of the projecting part 16 is provided as a base part 16a. The shock-absorbing member 14 is mounted on the bottom surface part 12 in an orientation in which the projecting part 16 extends in the longitudinal direction, and front and rear both end portions of the shock-absorbing member 14 are coupled, respectively, to front and rear both end portions of the bottom surface part 12.

On inner surfaces of the front wall part 13a, the rear wall part 13b, and the two side wall parts 13c of the peripheral surface part 13 of the housing case 3 are mounted respective reinforcing members 17. The reinforcing member 17 is formed with a hat-shaped cross-section having an opening facing the inner surface of the peripheral surface part 13, and is mounted on each of the front wall part 13a, the rear wall part 13b, and the two side wall parts 13c in an orientation extending in the transversal direction or the longitudinal direction.

The mounting of the reinforcing members 17 on the peripheral surface part 13 of the housing case 3 increases the strength of the housing case 3, which strengthens protection of each component disposed inside the housing case 3.

The partition plate 9 is placed and mounted on the reinforcing members 17, and the reinforcing members 17 have both the function of reinforcing the housing case 3 and the function of serving as a mounting member for mounting the partition plate 9. Accordingly, the onboard battery 1 does not need a dedicated member for mounting the partition plate 9, which reduces the number of components and thus simplifies a structure.

On an outer surface of the housing case 3, two deflection-preventing members 18 each formed in a substantially U-shape having an upward opening are mounted apart from each other in the transversal direction. The deflection-preventing member 18 is mounted at a position extending across the front wall part 13a, the bottom surface part 12, the rear wall part 13b, and the mounted part 13d.

The mounting of the two deflection-preventing members 18 on the housing case 3 prevents deflection of the housing case 3 in a state where the housing case 3 is inserted into the frame-shaped part 8 to be held by the holding frame 2, which ensures a stable disposition state of each component disposed inside the housing case 3.

An internal space 19 of the housing case 3 is a space where each component described later is housed, in addition to the two battery modules 5.

Figure 5:
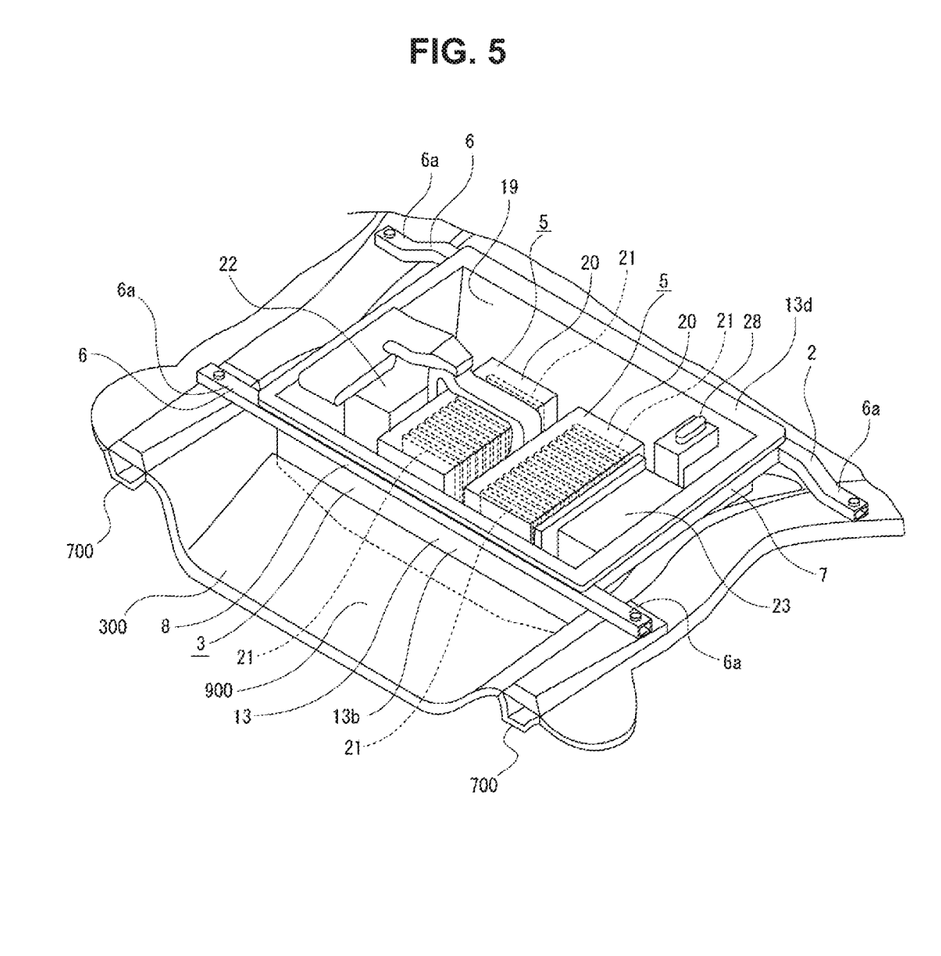
FIG. 5 is a perspective view illustrating a state of disposition of each component in a lower stage of a housing case.

The battery module 5 includes a cell cover 20 with a box shape whose long-side direction is the longitudinal direction and a plurality of battery cells 21 arranged side by side in the longitudinal direction inside the cell cover 20 (see FIG. 3). The two battery modules 5 are housed apart from each other in the transversal direction in the lower housing part 11 of the housing case 3 (see FIGS. 4 and 5).

The battery module 5 is disposed to extend over the two base parts 16a of the two adjacent projecting parts 16 of the shock-absorbing members 14.

Since the battery module 5 is disposed to extend over the two base parts 16a in this manner, a space is formed between the two base parts 16a below the battery module 5 in a state where the battery module 5 is disposed on the shock-absorbing members 14. This improves heat dissipation of the battery module 5 while stabilizing a disposition state of the battery module 5.

In addition, since the three shock-absorbing members 14 are mounted on the bottom surface part 12 of the housing case 3 and the two battery modules 5 are disposed on the three shock-absorbing members 14, the three shock-absorbing members 14 serve as disposition parts for disposing the two battery modules 5. This stabilizes a disposition state of the two battery modules 5 without causing an increase in the number of components.

In the lower housing part 11 of the housing case 3, a battery control unit 22 and a junction box 23 are housed on opposite sides in the transversal direction with the two battery modules 5 located therebetween. Accordingly, the two battery modules 5, the battery control unit 22, and the junction box 23 are housed in the lower stage in the internal space 19 of the housing case 3, and are located at or below the height of upper surfaces of the two rear side frames 700 (see FIG. 4). The battery control unit 22 has a function of governing the entire control of the onboard battery 1. The junction box 23 includes a relay, a fuse, a connector terminal, etc.

As described above, the lower housing part 11 of the housing case 3 is located between the two rear side frames 700, and the two battery modules 5, the battery control unit 22, and the junction box 23 housed in the lower housing part 11 are also located between the two rear side frames 700.

Figure 6:
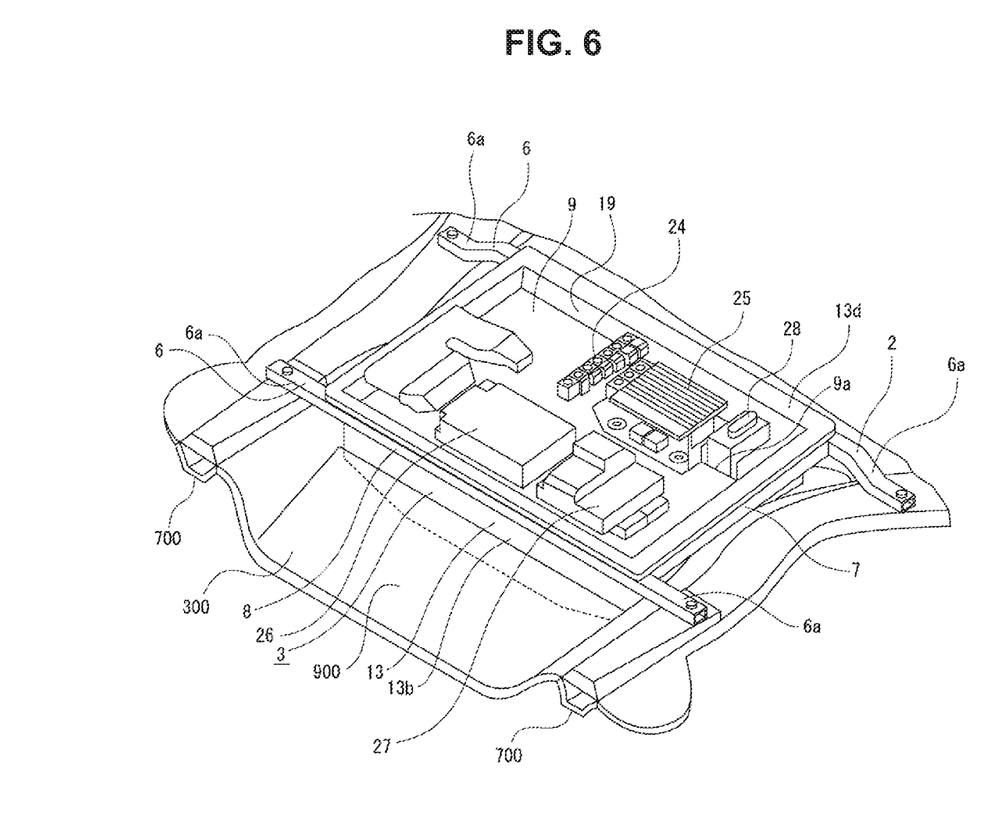
FIG. 6 is a perspective view illustrating a state of disposition of each component in an upper stage of a housing case.

In the upper housing part 10 of the housing case 3, a terminal strip 24 and a pump inverter 25 of an electric oil pump are arranged side by side in the transversal direction in a front-half part, and a DC/DC converter 26 and a unit inverter 27 of the battery control unit 22 are arranged side by side in the transversal direction in a rear-half part (see FIGS. 4 and 6). Accordingly, the terminal strip 24, the pump inverter 25, the DC/DC converter 26, and the unit inverter 27 are housed in the upper stage in the internal space 19 of the housing case 3.

In the housing case 3, a service plug 28 is disposed in front of the junction box 23. The service plug 28 is located at the notch 9a of the partition plate 9. The service plug 28 is located at a position viewable through the communicating hole 4a of the cover body 4 in a state where the cover body 4 is mounted on the housing case 3.

As described above, the two battery modules 5, the battery control unit 22, the junction box 23, the terminal strip 24, the pump inverter 25, the DC/DC converter 26, and the unit inverter 27 are disposed inside the housing case 3; all electrical components for driving the onboard battery 1 are disposed inside the housing case 3, being covered by the cover body 4.

Accordingly, the electrical components for driving the onboard battery 1 can be shielded from electromagnetic noise from the outside. The strengthening of electromagnetic shielding ensures an excellent driving state of the onboard battery 1.

Figure 7:
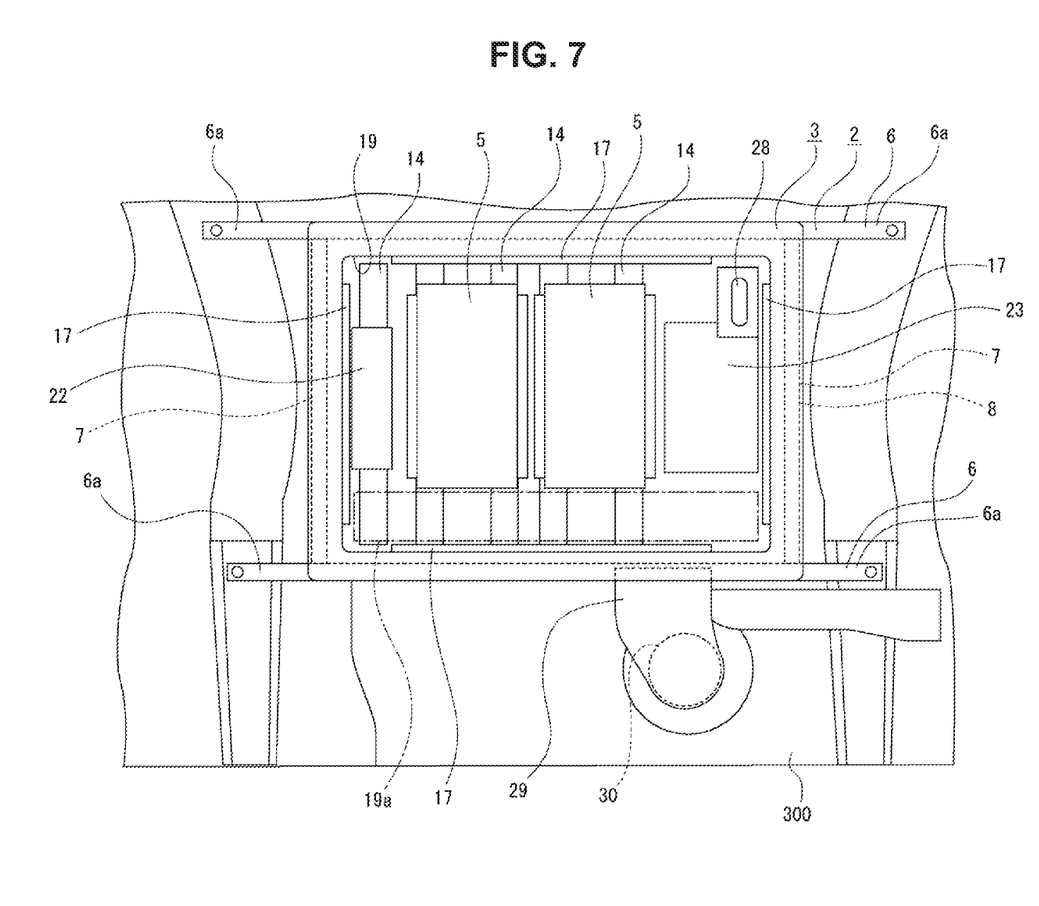
FIG. 7 is a plan view illustrating a state or the like of disposition of each component in a housing case.

Each component (e.g., the two battery modules 5) is disposed in the internal space 19 of the housing case 3, and in the internal space 19, a gap is formed behind the two battery modules 5, the battery control unit 22, and the junction box 23, which gap is formed as a housing part 19a (see FIG. 7).

The onboard battery 1 is provided with an intake duct 29 (see FIG. 2). The intake duct 29 penetrates the housing case 3 and, except for a part of it, is located in the crushable area 900 formed behind the housing case 3. Inside the intake duct 29 is disposed a fan motor 30 with a large weight, which is provided as a functional component in one implementation. The fan motor 30 is located at the same height as the lower housing part 11 of the housing case 3, being disposed between the two rear side frames 700.

To a rotating shaft of the fan motor 30 is coupled a cooling fan (not illustrated). The cooling fan has a function of taking in cooling air from the intake duct 29 and sending the cooling air to each component disposed inside the housing case 3 by being rotated, and the fan motor 30 has a function of rotating the cooling fan.

The fan motor 30 provided as a functional component in one implementation is located right behind the junction box 23, for example, in the crushable area 900 (see FIG. 7). Accordingly, the fan motor 30 is located on the right relative to a right end of the battery module 5 disposed on the right side. Note that the fan motor 30 may be located on the left relative to a left end of the battery module 5 disposed on the left side.

The onboard battery 1 is provided with an exhaust duct 31 (see FIG. 2). The exhaust duct 31 penetrates the housing case 3 and, except for a part of it, is located beside (on the left of) the housing case 3. The cooling air taken in from the intake duct 29 to cool each component disposed inside the housing case 3 is released outside the housing case 3 by the exhaust duct 31.

The cooling fan forcedly performs the above-described flow of the cooling air passing from the intake duct 29 through the inside of the housing case 3 to be released by the exhaust duct 31, efficiently cooling each component disposed inside the housing case 3, particularly the two battery modules 5, the battery control unit 22, the junction box 23, and the like.

If a vehicle that is equipped with the onboard battery 1 configured as described above is collided with from behind by another vehicle with a high vehicle height, such as a truck, a load due to a shock from the another vehicle is applied to the upper stage of the housing case 3, because rear side frames and a bumper beam of the another vehicle (e.g., truck) are present at a higher position than the two rear side frames 700 and the bumper beam 800 of the vehicle equipped with the onboard battery 1.

When a load due to a shock from the another vehicle is applied to the upper stage of the housing case 3, there is a possibility that a load is applied to the terminal strip 24, the pump inverter 25, the DC/DC converter 26, and the unit inverter 27 housed in the upper stage of the housing case 3, but a load is unlikely to be applied to the two battery modules 5, the battery control unit 22, and the junction box 23 housed in the lower stage. Accordingly, the two battery modules 5, the battery control unit 22, and the junction box 23 are protected.

On the other hand, if the vehicle equipped with the onboard battery 1 is collided with from behind by another vehicle with a low vehicle height, such as a car, the two rear side frames 700 and the bumper beam 800 are crushed to absorb a shock behind the housing case 3, because the two rear side frames 700 and the bumper beam 800 of the vehicle equipped with the onboard battery 1 is at substantially the same height as rear side frames and a bumper beam of the another vehicle (e.g., car).

As described above, when a vehicle with a low vehicle height (e.g., car) collides, the two rear side frames 700 and the bumper beam 800 absorb a shock. This prevents application of a large load to the housing case 3, thus retaining the housing case 3 in a state of being disposed in the trunk 200 to protect the onboard battery 1.

If the vehicle equipped with the onboard battery 1 is collided with from behind by another vehicle with a low vehicle height, such as a car, and the collision is severe, a load is applied to the housing case 3 after the two rear side frames 700 and the bumper beam 800 are crushed to absorb a shock.

In this case, since the three shock-absorbing members 14 are mounted on the housing case 3, the three shock-absorbing members 14 absorb a shock, which prevents application of a large load to the housing case 3 to protect each component disposed inside the housing case 3.

Furthermore, if the vehicle equipped with the onboard battery 1 is collided with from behind by another vehicle with a low vehicle height, such as a car, or if a rear part of the vehicle equipped with the onboard battery 1 collides with a telegraph pole etc. due to spin or the like (i.e., if so-called pole collision occurs), there is a possibility that the fan motor 30, which is a functional component with a large weight disposed in the crushable area 900, is moved forward by the collision.

In this case, since the fan motor 30 is located on the left or right of the two battery modules 5 in the transversal direction, the fan motor 30 does not come into contact with the two battery modules 5, which allows protection of the two battery modules 5.

Figure 8:
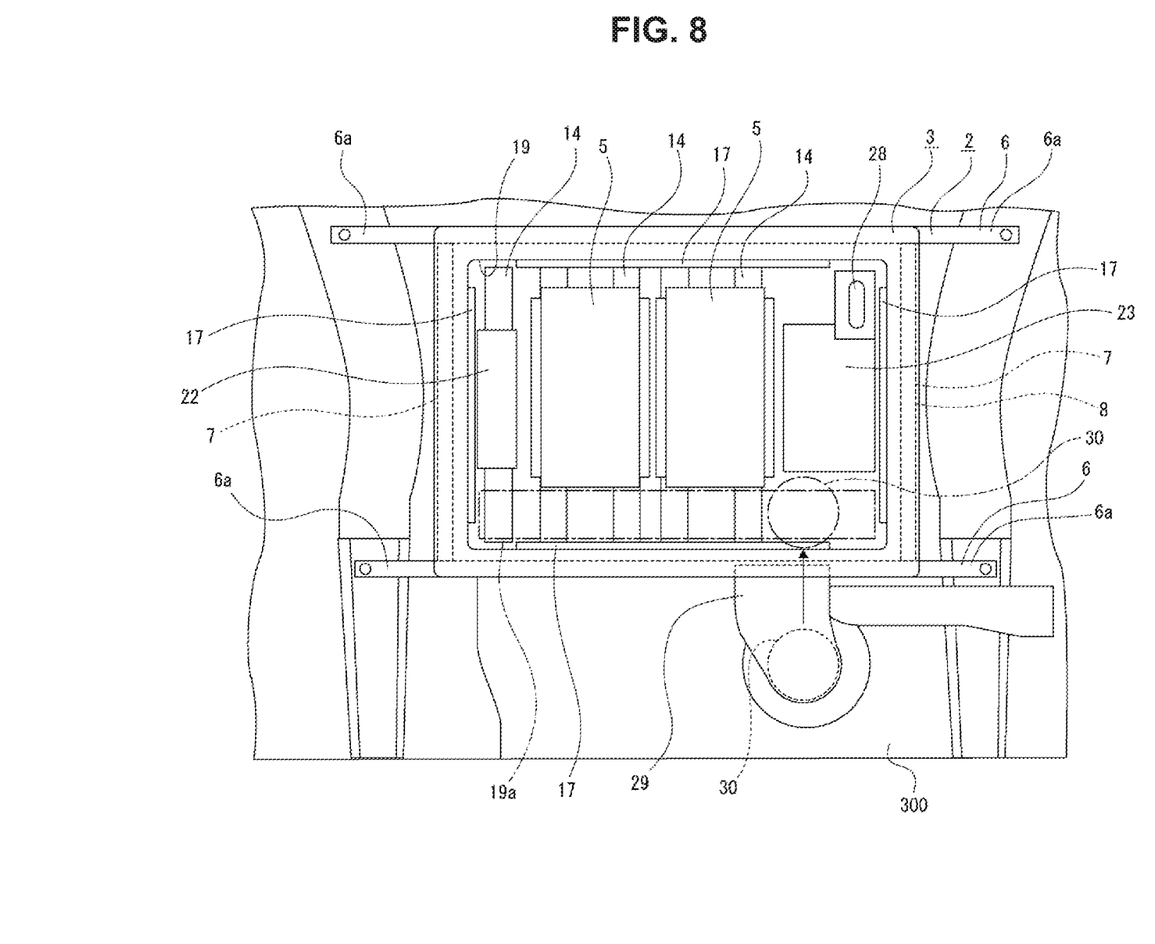
FIG. 8 is a plan view illustrating a state regarding a fan motor in collision.

There is also a possibility that the fan motor 30 breaks through the housing case 3 to be moved forward to the inside of the housing case 3, but since a rear end portion of the internal space 19 of the housing case 3 is formed as the housing part 19a, the fan motor 30 is housed in the housing part 19a when moved forward to the inside of the housing case 3 (see FIG. 8).

Accordingly, contact is avoided between the functional component and each component disposed inside the housing case 3, particularly the junction box 23 and the two battery modules 5. This prevents each component disposed inside the housing case 3 from being damaged or broken in collision.

Described above is an example of providing, as the functional component, the fan motor 30 that performs intake and exhaust for cooling each component disposed inside the housing case 3. Alternatively, the functional component may be, for example, a component with a large weight, such as a blowout repair kit for repairing a tire blowout or a jack etc. for lifting a vehicle.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. An onboard battery for a vehicle, the vehicle having a crushable area in which a functional component with a predetermined function is disposed, the crushable area being formed between a pair of rear side frames located apart from each other in a transversal direction, the onboard battery comprising:
   a housing case configured to be disposed in a front of the crushable area in a manner that the functional component is disposed behind the housing case in the crushable area;
   a holding frame that is fixable to a vehicle body and includes a frame-shaped part including a pair of first portions apart from each other in a longitudinal direction and a pair of second portions apart from each other in the transversal direction; and
   a battery module including a battery cell, wherein
      the housing case is held by the holding frame, while the housing case is inserted into the frame-shaped part and at least of a part of the housing case is located below the holding frame between the pair of second portions,
      the battery module is housed inside the housing case,
      the functional component is located below the holding frame between the pair of second portions, and
      a rear end portion of the inside of the housing case is provided with a housing part capable of housing the functional component when the functional component is moved forward by a collision.

2. The onboard battery according to claim 1, wherein the battery module is located at or below a height of upper surfaces of the pair of rear side frames, between the pair of rear side frames.

3. The onboard battery according to claim 2, wherein the battery module is located beside the functional component in the transversal direction.

4. The onboard battery according to claim 3, wherein
a battery control unit and a junction box are disposed inside the housing case, and
the battery control unit and the junction box are located at or below the height of upper surfaces of the pair of rear side frames, between the pair of rear side frames.

5. The onboard battery according to claim 3, wherein a shock-absorbing member that absorbs a shock in a collision from behind is mounted on the housing case.

6. The onboard battery according to claim 5, wherein
the shock-absorbing member is mounted on a bottom surface part of the housing case, and
the battery module is disposed on the shock-absorbing member.

7. The onboard battery according to claim 6, wherein
the shock-absorbing member is provided with base parts located above the bottom surface part, the base parts being located apart from each other in the transversal direction, and
the battery module is disposed to extend over the base parts.

8. The onboard battery according to claim 2, wherein
a battery control unit and a junction box are disposed inside the housing case, and
the battery control unit and the junction box are located at or below the height of upper surfaces of the pair of rear side frames between the pair of rear side frames.

9. The onboard battery according to claim 2, wherein a shock-absorbing member that absorbs a shock in a collision from behind is mounted on the housing case.

10. The onboard battery according to claim 9, wherein
the shock-absorbing member is mounted on a bottom surface part of the housing case, and
the battery module is disposed on the shock-absorbing member.

11. The onboard battery according to claim 10, wherein
the shock-absorbing member is provided with base parts located above the bottom surface part, the base parts being located apart from each other in the transversal direction, and
the battery module is disposed to extend over the base parts.

12. The onboard battery according to claim 1, wherein the battery module is located beside the functional component in the transversal direction.

13. The onboard battery according to claim 12, wherein
a battery control unit and a junction box are disposed inside the housing case, and
the battery control unit and the junction box are located at or below a height of upper surfaces of the pair of rear side frames, between the pair of rear side frames.

14. The onboard battery according to claim 12, wherein a shock-absorbing member that absorbs a shock in a collision from behind is mounted on the housing case.

15. The onboard battery according to claim 14, wherein
the shock-absorbing member is mounted on a bottom surface part of the housing case, and
the battery module is disposed on the shock-absorbing member.

16. The onboard battery according to claim 15, wherein
the shock-absorbing member is provided with base parts located above the bottom surface part, the base parts being located apart from each other in the transversal direction, and
the battery module is disposed to extend over the base parts.

17. The onboard battery according to claim 1, wherein
a battery control unit and a junction box are disposed inside the housing case, and
the battery control unit and the junction box are located at or below a height of upper surfaces of the pair of rear side frames, between the pair of rear side frames.

18. The onboard battery according to claim 1, wherein a shock-absorbing member that absorbs a shock in a collision from behind is mounted on the housing case.

19. The onboard battery according to claim 18, wherein
the shock-absorbing member is mounted on a bottom surface part of the housing case, and
the battery module is disposed on the shock-absorbing member.

20. The onboard battery according to claim 19, wherein
the shock-absorbing member is provided with base parts located above the bottom surface part, the base parts being located apart from each other in the transversal direction, and
the battery module is disposed to extend over the base parts.

* * * * *